Oct. 31, 1961     C. BUDDINGH ET AL     3,006,423
ROTARY MULCHER AND WEEDER
Original Filed Dec. 27, 1955     2 Sheets-Sheet 1
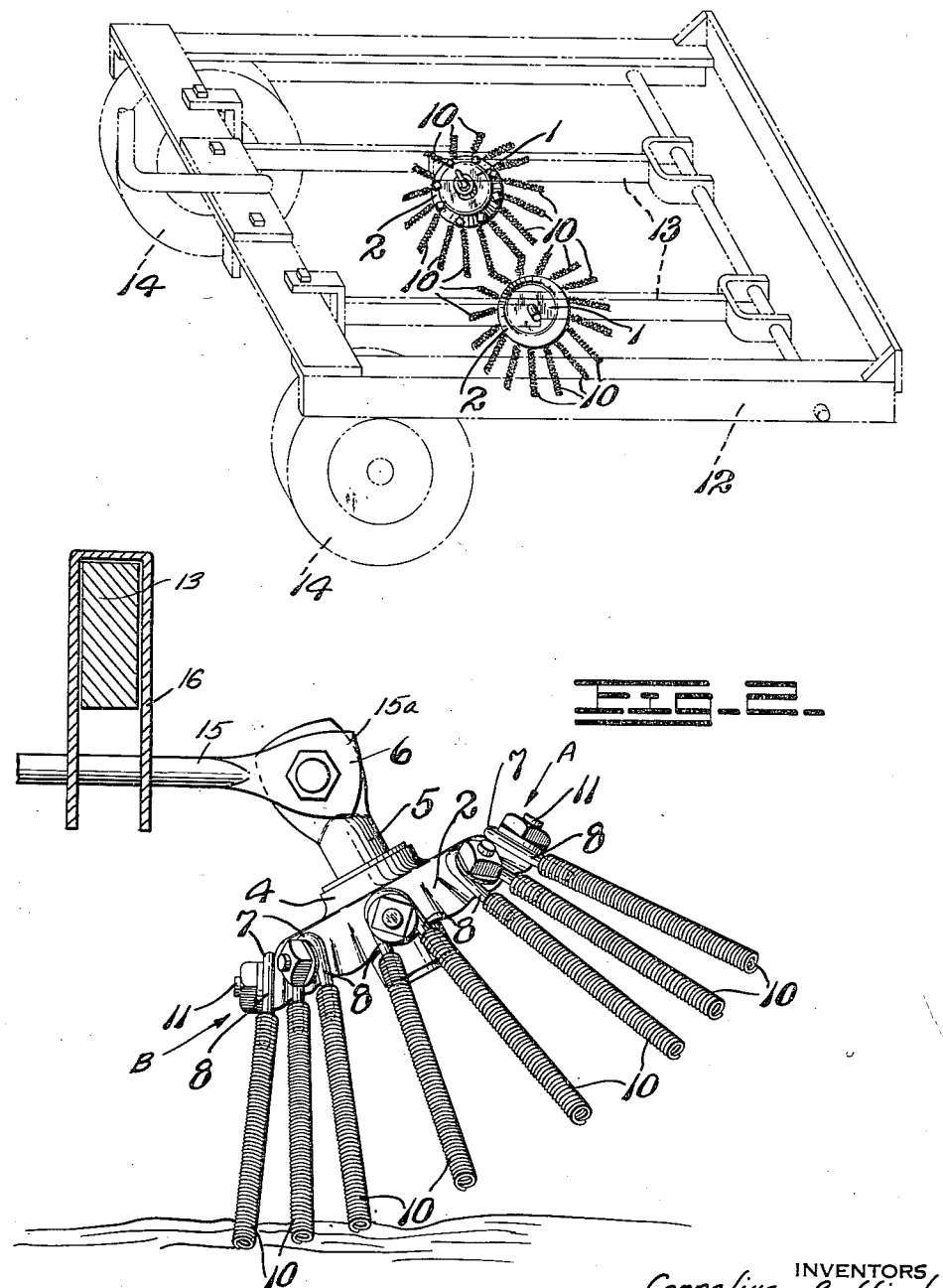
INVENTORS
Cornelius Buddingh
Marinus J. Buddingh
BY Frank E. Liverance, Jr.
ATTORNEY

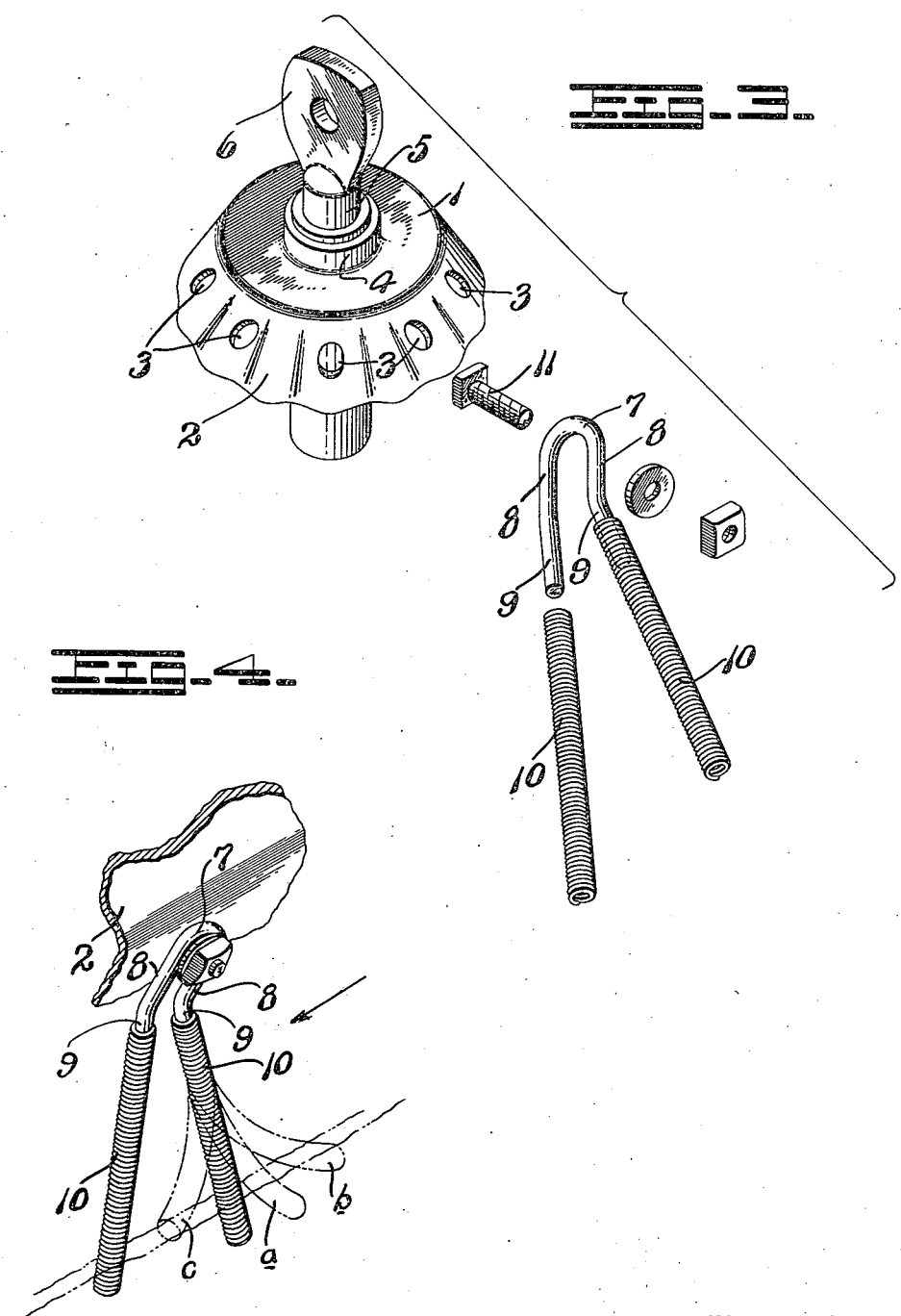

United States Patent Office 3,006,423
Patented Oct. 31, 1961

3,006,423
ROTARY MULCHER AND WEEDER
Cornelius Buddingh and Marinus Buddingh, both of 35800 100th, Caledonia, Mich.
Continuation of abandoned application Ser. No. 555,426, Dec. 27, 1955. This application Apr. 3, 1958, Ser. No. 727,517
2 Claims. (Cl. 172—523)

This invention relates to a weeder for plants, being a practical, useful, effective, simplified improvement upon the weeder shown in our pending application, Serial No. 501,385, filed April 14, 1955, now U.S. Patent No. 2,912,055. This application is a continuation of patent application Serial No. 555,426 filed December 27, 1955, now abandoned.

Like in the weeder of application Serial No. 501,385, this invention is particularly useful when plants are small for effectively removing weeds which are closely adjacent the plants and in many cases between the plants in rows thereof. Such weeds are to be removed when the plants are small and as soon as possible after the weeds have germinated. The ordinary cultivation between rows of plants such as celery, onions, corn, beans and many others, while it destroys most of the weeds between the plant rows, does not reach those closely adjacent the plants or between such plants. If such weeds are not eradicated soon after germination they grow rapidly, the roots penetrating deeply and upon getting a good start will use a large portion of the nourishment which should go to the plants.

With our present invention a simple, practical, novel and useful weeder for plants is provided which reduces the number of parts required in the weeder above identified, lessening the cost of manufacture and obtaining in some ways a more effective destruction of small weeds, and removing in very large measure weeds which normally may be unaffected by ordinary and regular cultivation. With the present invention using two of the weeders of our invention, one at each side of a plant row, the ground is stirred and broken right at the plants and such ground with the small newly germinated weeds is moved or thrown away from the plants into the space between the rows where they may be taken care of and destroyed by the subsequent regular cultivation between the plant rows.

Our invention which attains the functions above stated may be understood from the following description taken in connection with the accompanying drawings, in which, FIG. 1 shows generally in perspective two weeders of our invention indicated as mounted upon a movable support therefor for drawing lengthwise of a row of plants, one of the weeders at each side thereof.

FIG. 2 is a side elevation of the weeder of our invention substantially at the position it occupies angularly to the vertical when in use.

FIG. 3 is a disassembled view in perspective showing parts or elements which are used in building the weeder unit of our invention, and FIG. 4 is a fragmentary perspective view showing one of the weeder elements at the position it occupies when the ground is engaged and broken and substantially swept in a direction away from the plant row as the weeder units are moved lengthwise thereof.

Like reference characters refer to like parts in the different figures of the drawings.

In the construction of a weeder unit, a generally frustoconical dome or head of flat metal is provided having an upper side 1 from which downwardly and outwardly annular sides 2 integral therewith extend. At spaced intervals around the side or flange 2 openings 3 are made therethrough. The upper side or top 1 has a central hub flange 4. Such dome is mounted for free rotation on a short shaft 5 extending through the hub 4, its upper end being flattened as at 6 and having a bolt passing opening as shown. The detailed structure for rotatably mounting the dome on the shaft 6 is not shown as it may be provided in many different manners by those skilled in the art.

At the outer side of the downwardly extending annular side or flange 6, and with one at each of the openings 3, a member is located, comprising a rod bent into U-shape, having an upper curved connecting section 7 from which two spaced legs 8 extend, each of short length, and each terminating in an outwardly bent terminal section 9. On each of the terminal sections 9 a flexible ground engaging element 10 is permanently secured at its upper end portion, telescoping over the part 9 with which associated, gripping it tightly and being in use substantially permanently connected therewith. However, each of the ground engaging sections 10 may be removed from the rod sections 9 to which connected. Such ground engaging members 10 are formed in continuous closely contacting coils wound the same as a spring and having spring qualities. Attachment is made at the openings 3 by bolts 11 receiving each a washer and nut as fully shown.

In the use of the weeder a carriage for mounting the same thereon, shown in dash and dot lines at 12 in FIG. 1, may have two spaced parallel bars 13 inwardly from the sides thereof on each of which a weeder unit is mounted. The rear ends of the frame are carried by wheels 14, the front end in use being secured to a tractor or the like so that the frame member is drawn in a substantially horizontal position. The specific means by which the weeders are secured to the bars 13 is not of importance in connection with the present invention as they may be mounted in numerous ways, one of which consists of a bar 15 and with a flattened end 15a mounted against the flat upper end 6 of the shaft 5 and bolted thereto and extending laterally therefrom and permanently connected to a bar 13 by bracket 16. The weeder is adjustable about the central axis of the bolt passing through the flattened portion 6.

When in place and ready for use a weeder will occupy substantially the position with reference to the vertical as shown in FIG. 2. The head or dome is inclined to the vertical so that the points of attachment of the springs to the head move from an uppermost point, denoted as A, to a lowermost point B. Such weeder as in FIG. 2 will be at the right hand side of a row of plants. The length of the springs are such that they extend a greater distance from the head than the distance measured from the lowermost point of attachment to the ground while the distance measured from the uppermost point of attachment to the ground is less than the extending distance of the springs. This arrangement causes the lower ends of the ground engaging members 7 to come in succession to and penetrate the ground at each side of a row of plants when two weeders are used, the ground engaging members 10 being very nearly vertical upon coming to and penetrating the ground. Such weeders are turned automatically about the inclined axis of the shaft 5 by reason of the lower end portions of the members 10 engaging and penetrating the ground and thereby turning the domes to which connected as the carriage upon which the weeder units are mounted is moved lengthwise of a row of plants.

As the lower ends of the ground engaging members 10 reach the ground they progressively penetrate it until, when an element is at its greatest degree of penetration, it is in a vertical plane substantially at right angles to the row of plants. The resistance to penetration will cause the lower end portion of a weeding member 10 to bend laterally, first taking a position like at a in FIG. 4 and thereafter a further strained position as at $b$; and with continued rotation of the dome to which connected, the lower end of the weeder member 10 starts to lift out of the ground, the spring force causing its lower end portion to swing rapidly from the position at $b$ in FIG. 4 to that at $c$ projecting or kicking the ground away from the plant row. After the deepest point of penetration has been reached the weeding member moves away generally in the arc of a circle from the plant row and upwardly out of the ground.

With the weeder structure as described, each having a plurality of the downwardly and outwardly disposed spring yielding weeder members 10 free at their lower ends to penetrate the ground, the rotative movement described breaks the ground surface where the lower end portions of the members 10 penetrate. A continuous weeding of a plant row takes place. When weeds are small or shortly after germination, their roots penetrate the ground at a maximum generally not exceeding one-quarter of an inch. The roots of plants in a row, particularly onions and celery and many other plants, at a minimum are at least one inch below the upper surface of the ground. The plants are not damaged. The weeds are all substantially removed from the plant row. Further, taking care of the weeds which have thus been moved outwardly away from a row of plants may be done in many ways, as by a weed sweeping apparatus which we have invented and which may follow immediately after the weeder of our invention has served its purposes. The structure described has few parts, is simple in construction, is readily manufactured at low cost and serves the purposes for which it has been designed in a particularly efficient manner.

The invention is defined in the appended claims and is to be considered comprehensive of all forms of structure coming within their scope.

We claim:

1. Structure as described, comprising, means movably supported on the ground, a shaft adapted to be mounted on said means with its axis inclined to the vertical, a dome of frusto-conical form rotatably mounted on said shaft, said dome having a depending outwardly and downwardly extending flange, a plurality of spaced, short rods secured to said flange having short outwardly and downwardly extending free end portions and an elongated flexible, yieldingly resisting member surrounding and connected at one end portion to each of said rods at the free end portions thereof and in alignment therewith, diverging downwardly from the axis of said shaft, said members coming to substantially vertical position in succession on rotation around said shaft and said free end portions thereof engaging the ground at and proximate said substantially vertical position.

2. Structure as described, comprising, means movably supported on the ground, a shaft adapted to be mounted on said means and inclined to the vertical, a dome of frusto-conical form rotatably mounted on said shaft, said dome having an upper side and a continuous, depending, downwardly and outwardly extending flange with a plurality of generally equally spaced openings through said flange around the dome, a U-shaped member made of metal rod located at the outer side of said flange, one at each opening therein, each member having two spaced downwardly and outwardly extending short legs, bolts passing through said openings for detachably connecting the members to said flange, and an elongated closely coiled spring member around and gripping each leg and extending therefrom normally in alignment therewith and of a length sufficient to engage the ground at and proximate the time when said rods are in lowest position during rotation of said head.

References Cited in the file of this patent

UNITED STATES PATENTS

| | | |
|---|---|---|
| 251,784 | Lindsey | Jan. 3, 1882 |
| 397,155 | Tush | Feb. 5, 1889 |
| 481,841 | Bourgin | Aug. 30, 1892 |
| 622,162 | Pattisson | Mar. 28, 1899 |
| 692,585 | Adams | Feb. 4, 1902 |
| 888,348 | Nichols | May 19, 1908 |
| 2,061,694 | Cuddigan | Nov. 24, 1936 |
| 2,912,055 | Buddingh et al. | Nov. 10, 1959 |

FOREIGN PATENTS

| | | |
|---|---|---|
| 622,777 | Great Britain | May 6, 1949 |